US008953275B2

(12) United States Patent
Chou et al.

(10) Patent No.: US 8,953,275 B2
(45) Date of Patent: Feb. 10, 2015

(54) IN SITU SENSOR BASED CONTACT DETECTION

(71) Applicant: Seagate Technology LLC, Cupertino, CA (US)

(72) Inventors: Andy Chou, Singapore (SG); Quan Li, Singapore (SG); Chee Wee Cheng, Singapore (SG); Beng Theam Ko, Singapore (SG); Myint Ngwe, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/919,207

(22) Filed: Jun. 17, 2013

(65) Prior Publication Data

US 2014/0368946 A1 Dec. 18, 2014

(51) Int. Cl.
*G11B 21/02* (2006.01)
*G11B 27/36* (2006.01)
*G11B 5/60* (2006.01)
*G11B 5/03* (2006.01)

(52) U.S. Cl.
CPC ............. *G11B 5/6076* (2013.01); *G11B 5/03* (2013.01)
USPC .............................................. 360/75; 360/31

(58) Field of Classification Search
None
See application file for complete search history.

(56) References Cited

U.S. PATENT DOCUMENTS

| 7,952,829 | B2 | 5/2011 | Ionescu |
| 8,085,491 | B2 | 12/2011 | Antoku |
| 8,094,418 | B2 * | 1/2012 | Schreck et al. ............... 360/317 |
| 8,274,761 | B2 | 9/2012 | Kanaya |
| 8,369,190 | B2 * | 2/2013 | Polley et al. ............... 369/13.11 |
| 8,625,214 | B2 * | 1/2014 | Takeuchi et al. ............... 360/31 |
| 8,681,445 | B1 * | 3/2014 | Kermiche et al. ............... 360/55 |
| 2012/0002319 | A1 | 1/2012 | Kondo |
| 2012/0008230 | A1 | 1/2012 | Nishioka |
| 2012/0120522 | A1 | 5/2012 | Johnson |
| 2012/0218659 | A1 | 8/2012 | Liu |

OTHER PUBLICATIONS

Agarwal et al., "Analog Signals," *Foundations of Analog and Digital Electronic Circuits*, San Francisco, CA, 2005, pp. 41-42.

* cited by examiner

*Primary Examiner* — Andrew L Sniezek
(74) *Attorney, Agent, or Firm* — Mueting, Raasch & Gebhardt, P.A.

(57) ABSTRACT

A method for detecting a contact event between a transducer and a recording medium is disclosed. The method includes positioning a transducer with respect to a recording medium, where the transducer includes a writer, a reader, a heater, and a thermally responsive sensor. The method further includes applying power to the heater to establish a fly height of the transducer; supplying a bias current through the thermally responsive sensor to generate a bias signal; measuring a root mean square (RMS) voltage $V_{RMS}$ of the thermally responsive sensor based on the bias signal; determining a threshold voltage $V_T$; and detecting a contact event between the transducer and the medium based on $V_{RMS}$ being greater than $V_T$.

20 Claims, 7 Drawing Sheets

IN SITU SENSOR BASED CONTACT DETECTION

SUMMARY

Various embodiments of the present disclosure are generally directed to positional sensing and control.

In one embodiment, the present disclosure provides a method that includes positioning a transducer with respect to a recording medium, the transducer including a writer, a reader, a heater, and a thermally responsive sensor. The method further includes applying power to the heater to establish a fly height of the transducer; supplying a bias current through the thermally responsive sensor to generate a bias signal; measuring a root mean square (RMS) voltage $V_{RMS}$ of the thermally responsive sensor based on the bias signal; determining a threshold voltage $V_T$; and detecting a contact event between the transducer and the medium based on $V_{RMS}$ being greater than $V_T$.

In another embodiment, the present disclosure provides an apparatus that includes a recording medium; a transducer adjacent the recording medium, where the transducer comprises a writer, a reader, a heater, and a thermally responsive sensor; and a control circuit coupled to the transducer. The control circuit is adapted to apply power to the heater to establish a fly height of the transducer; supply a bias current through the thermally responsive sensor to generate a bias signal; measure an RMS voltage $V_{RMS}$ of the thermally responsive sensor based on the bias signal; determine a threshold voltage $V_T$; and detect a contact event between the transducer and the medium based on $V_{RMS}$ being greater than $V_T$.

In another embodiment, the present disclosure provides a system that includes a recording medium adapted for rotation about a central axis, the recording medium storing a plurality of spaced apart servo wedges that define tracks adapted to store data in data sectors between adjacent pairs of the servo wedges; and a transducer adjacent the recording medium. The transducer includes a writer adapted to store data to the data sectors, a reader adapted to read back the data stored to the data sectors and to read back servo data from the servo wedges, a write heater adapted to lower a fly height distance between the writer and the medium responsive to an applied write heater value, a read heater adapted to lower a fly height distance between the reader and the medium responsive to an applied read heater value, and at least one thermally responsive sensor. The apparatus also includes a preamplifier circuit adapted to, during a write operation apply write signals to the writer to write data to a selected track; apply the write heater value to the write heater to establish a first fly height distance for the writer; apply a bias current to the thermally responsive sensor; measure an RMS voltage $V_{RMS}$ of the thermally responsive sensor based on the bias signal; determine a threshold voltage $V_T$; and detect a contact event between the transducer and the medium based on $V_{RMS}$ being greater than $V_T$.

These and other embodiments of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1A:
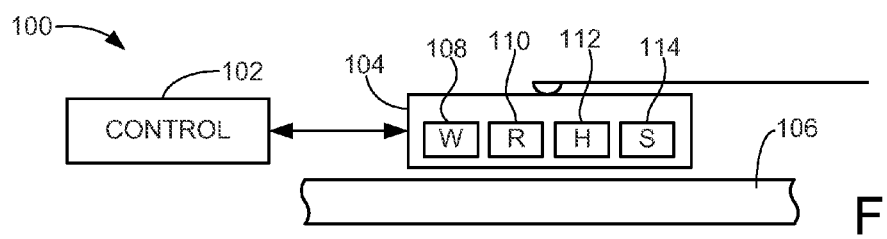
FIG. 1A is a functional representation of a data storage device.

The present disclosure generally relates to positional control systems, such as the type used to control a fly height of a data transducer adjacent a rotatable data storage medium.

Some data storage devices use a transducer to write data to and read data from a rotatable data storage medium. The transducer may be hydrodynamically supported adjacent the rotating data medium by fluidic currents that interact with a fluidic (air) bearing surface. A fly height adjustment mechanism can be used to adjust the fly height of the transducer to an appropriate level, and a contact detection system can be used to detect contact events between the transducer and the medium surface.

A calibration routine can be carried out to select appropriate fly heights during read and write operations to allow the transducer to fly in close, stable proximity to the medium surface while substantially avoiding contact events. Such calibration routines can rely on a variety of sensor inputs such as read sensor data from a reader of the transducer used to read data from the medium, motor control inputs from a voice coil motor (VCM) used to position the transducer, etc. Signals from the reader can include position error signals (PES), VCM signals, etc. These approaches generally rely on horizontal displacement (off-track detection) to identify a contact event.

While operable, one limitation with such approaches is the reliance on the detection of horizontal off-track displacement to sense a change in vertical displacement of the transducer relative to the medium surface. Contact occurs when the vertical displacement (fly height) essentially becomes zero. Once contact is made, however, the transducer may be displaced laterally (horizontally), exhibiting off-track error that can be sensed from measured positional error or changes in readback signal amplitude. Relying on horizontal displacement measurements is reactive since the displacement can generally be measured only once contact has taken place.

Another limitation with such current generation off-track situ detectors is that significant contact with the medium may be required before contact can be detected. Detectors may exhibit different responses at different skew angles and/or radial locations on the medium, as well as different responses based on a number of operational parameters, including temperature, write quality, read quality, servo errors, offsets, actuator tolerances, and so on. Extended contact situations can increase burnishing of a medium surface and other deleterious effects.

As continued increases in areal data storage densities drive higher track densities, the individual tracks become smaller, which decreases servo margin (e.g., servo signal to noise ratio SNR). Using servo based algorithms to compute the degree of off-track becomes increasingly less precise for lower levels of servo SNR.

Accordingly, various embodiments of the present disclosure are generally directed to an in situ vertical displacement detection and control system. As explained herein, in some embodiments a transducer is adapted to fly in non-contacting relation to a rotating data storage medium. The transducer includes a writer, a reader, a heater unit, and a thermally responsive sensor. In some embodiments, the heater unit and/or the thermally responsive sensor can be included in or combined with the writer or the reader.

A control circuit is adapted to provide respective signals to each of the transducer elements. These signals may include a write signal to the writer to write data to the medium during a write operation, a read bias signal to the reader to read back data stored to the medium during a read operation, a heater signal to the heater to adjust a fly height of the transducer, and a thermal bias signal to the thermally responsive sensor to detect a contact event between the transducer and the medium.

The control circuit is adapted to determine the thermal energy of the thermally responsive sensor to establish threshold thermal energy values that represent the energy of contact between the transducer and the medium. Thereafter, the control circuit can monitor the system for the occurrence of contact events and take corrective actions to reduce the impact on system performance.

In some embodiments, the control circuit forms a portion of a preamplifier/driver (preamp) circuit of a data storage device. The preamp performs in-situ calibration and detection at appropriate times during the operational life of the device. The thermally responsive sensor may be a high temperature coefficient of resistance (TCR) element that translates small temperature changes to large electrical signal changes. The preamp biases the thermally responsive sensor, amplifies the output signal from the sensor, and processes the amplified signal.

Some embodiments derive the final fly height values for the transducer based on two main variables: the bias level applied to the sensor to obtain optimal SNR response, and the detection threshold level suitable to reliably detect a contact event. The first variable can be empirically determined. And the second can be established by various techniques discussed in detail herein.

FIG. 1A is a functional block diagram of a data system 100 in accordance with some embodiments. The data system 100 includes a control circuit 102, and a transducer 104 adjacent a data storage medium 106. The transducer 104 incorporates a slider (not separately shown) with hydrodynamic features such as an air bearing surface (ABS) to facilitate stable support of the transducer 104 above and in close proximity to the storage medium 106 during rotation of the medium.

The control circuit 102 interfaces with various operational elements of the transducer 104. These elements include a writer 108, a reader 110, and optionally a separate heater 112 and a thermally responsive sensor 114.

The writer 108 can be used to magnetically write data to data tracks defined on the medium surface. The writer may employ perpendicular magnetic recording and heat assisted magnetic recording (HAMR) techniques. The reader 110 is used to sense the previously written magnetic data, and may utilize a magneto-resistive (MR) sensor or similar design. The heater 112 generally constitutes a thermally responsive material that heats up rapidly due to the application of power (e.g., current) material. The heat generated by the heater 112 is thermally transferred to the writer and reader 108, 110, inducing them to thermally expand and consequently reduce the separation between writer and reader and the medium surface. Separate write and read heaters may be used as desired. In some embodiments, the writer 108 may serve as heater 112.

The thermally responsive sensor 114 includes a resistive material that operates as a highly sensitive thermal transducer. The control circuit 102 applies a sense bias current through the sensor 114 to increase its temperature such that the sensor is at a sufficient level of thermal sensitivity. Any excitation to the thermal state of this sensor induces instantaneous resistive changes within the sensor that can be seen as electrical pulses. Multiple sensors can be used, including sensors arranged at different corners or other locations on the slider. Individual bias currents may be supplied to each of the thermally responsive sensors 114. In some embodiments, the reader 110 may also serve as thermally responsive sensor 114.

Figure 1B:
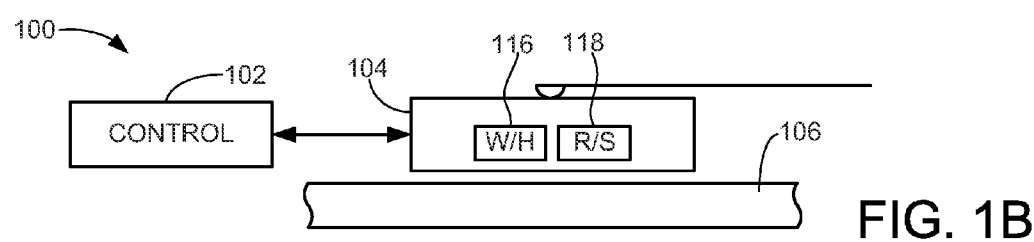
FIG. 1B is another functional representation of the device of FIG. 1A.

FIG. 1B is another representation of the device 100 of FIG. 1A. A combined writer/heater (W/H) is depicted at 116, and a combined reader/sensor (R/S) is depicted at 118.

Figure 2:
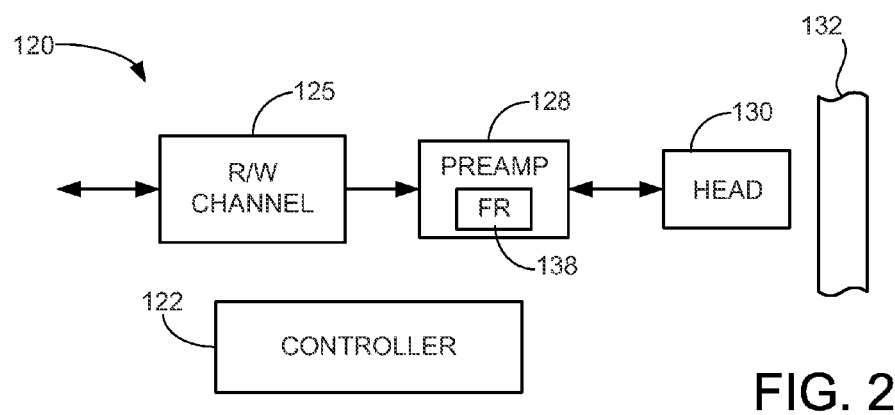
FIG. 2 is a functional representation of another data storage device.

FIG. 2 depicts another data system 120 similar to the system 100 of FIGS. 1A-1B. The data system 120 of FIG. 2 is characterized as a hard disc drive (HDD) data storage system, although such is merely exemplary and not limiting. The system 120 includes a controller 122 that provides top level control for the device. A read/write (R/W) channel 125 includes a write channel portion operable to encode input write data from the host to provide a serialized data stream to a preamplifier/driver (preamp) 128.

The preamp 128 provides a sequence of write currents to a transducer (head) 130 to write data to a magnetic data recording medium 132 during a write operation. During a read operation, the preamp 128 obtains readback signals from the transducer 130, conditions and amplifies the readback signals, and provides the same to a read channel portion of the R/W channel 125. The read channel portion applies signal processing techniques to recover the originally stored data, which may be stored in a buffer of an interface (I/F) circuit (not shown) pending subsequent transfer to the host. In some embodiments, the preamp 128 is also configured to supply the bias current through the thermally responsive sensor to generate a bias signal as is further described herein.

During both read and write operations, specially configured servo positioning data on the medium 132 may be recovered by the transducer 130 and supplied to a servo control circuit (not separately shown).

Figure 3:
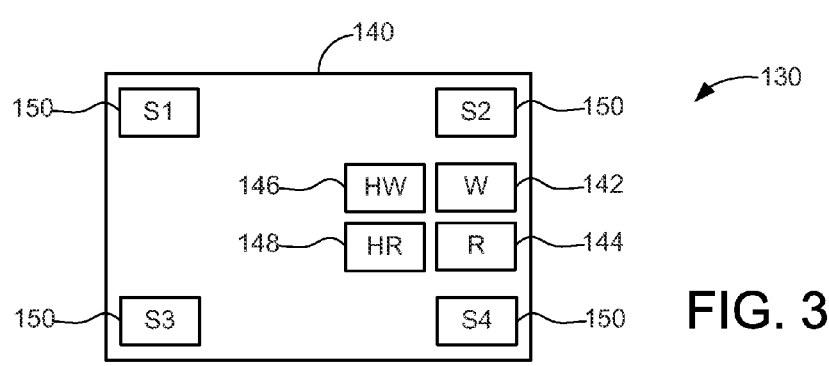
FIG. 3 shows an arrangement of the data transducer of FIG. 2 in accordance with some embodiments.

FIG. 3 depicts the transducer 130 of FIG. 2 in accordance with some embodiments. A slider 140 supports a writer 142, a reader 144, a write heater 146, a read heater 148, and four thermal sensors 150 denoted as sensors S1-S4. The preamp 128 (FIG. 2) supplies appropriate control signals to each of these elements during operation. The thermal signals from the sensors 150 can be separately analyzed or combined into a composite signal, as desired. It will be appreciated that the relative placement and locations of the various elements can vary as desired. The sensors 150 can be nominally identical or individually tailored for different lateral locations on the slider 140. Sensors S1-S4 can be placed in locations where information regarding contact events may be collected. The total number of sensors 150 can include two, three, five or any amount of sensors that meet the needs of the system 120.

Figure 4:
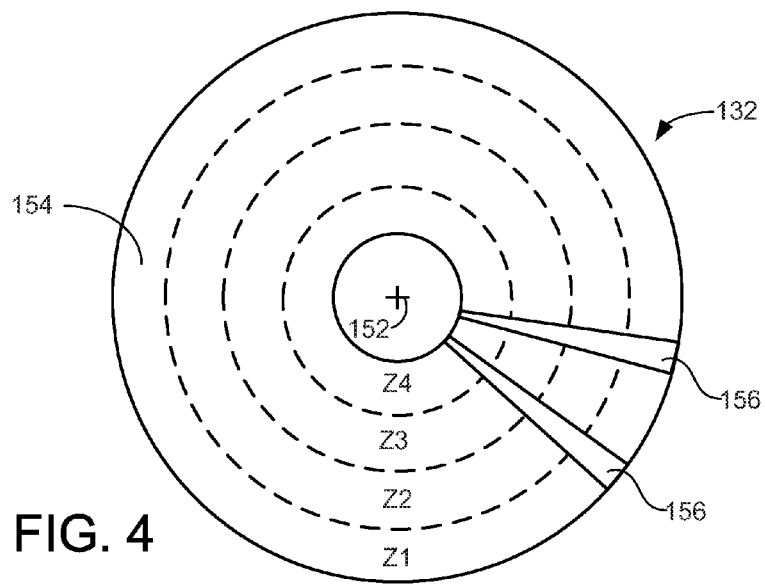
FIG. 4 depicts the storage medium of FIG. 2 in accordance with some embodiments.

FIG. 4 shows the storage medium 132 of FIG. 2 in accordance with some embodiments. The medium 132 may be characterized as a perpendicular magnetic recording disc, heat assisted recording disc, or bit patterned disc, although such is merely for purposes of illustration and is not limiting.

The data tracks on the medium 132 are grouped together into a number of concentric zones 154. The zones are denoted herein as Zones 1-4 (Z1-Z4). Separate write and read fly height calibration values can be determined for each zone. Any number of different zones can be defined based on the desired resolution, including zones of different sizes, locations and radial widths.

The servo data used by the controller 122 of FIG. 2 can be arranged as a plurality of servo wedges, two of which are represented at 156. The servo wedges are arrayed in spaced apart fashion around the circumference of the medium 132 much like spokes of a wheel. While only two servo wedges 156 are depicted in FIG. 4, it will be appreciated that several hundred such wedges (or more) may be provisioned around the medium. User data are written to sectors along the tracks in the areas between adjacent pairs of the servo wedges 156. The servo wedges 156 provide the requisite servo positioning control data to the controller 122 (FIG. 2) to facilitate precise positioning of the respective reader and writer 142, 144 during read and write operations as well as during calibration processing.

Figure 5:
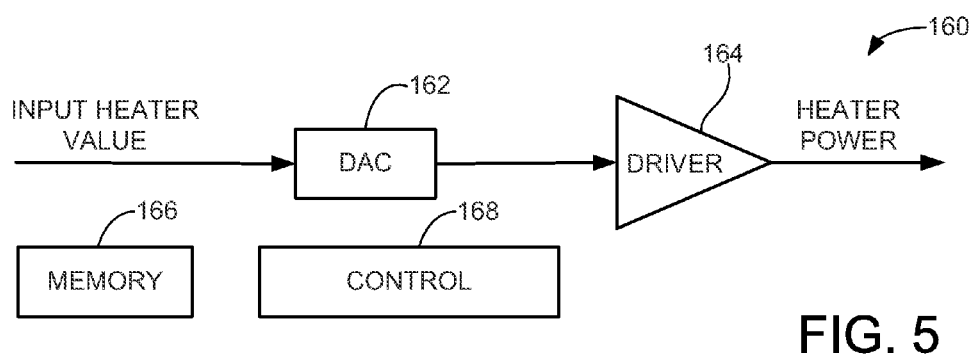
FIG. 5 depicts a heater power control circuit of the preamp of FIG. 2.

FIG. 5 provides a heater control circuit 160 of the preamp 128 in accordance with some embodiments. The heater control circuit 160 includes a digital to analog converter 162 and a driver 164. Generally, an input heater power level H, expressed in digital form as a multi-bit representation over a selected range, is converted to a corresponding analog input to the driver 164, which in turn supplies power (such as in the form of applied voltage and/or current) to the associated heater (e.g., the write heater 146 or the read heater 148 of FIG. 3).

A separate driver can be provided for each heater, or the circuit 160 can be multiplexed using suitable switching circuitry (not separately shown) to apply the appropriate heater signals to the respective heater elements. The various parameters used by the system, such as the threshold detection values, the heater values, etc., may be stored in a local memory 166 incorporated into or accessible by the preamp 128. Control functions discussed herein can be carried out by a local preamp controller 168 or by another control circuit, such as the controllers 102, 122 in FIGS. 1-2.

Figure 6:
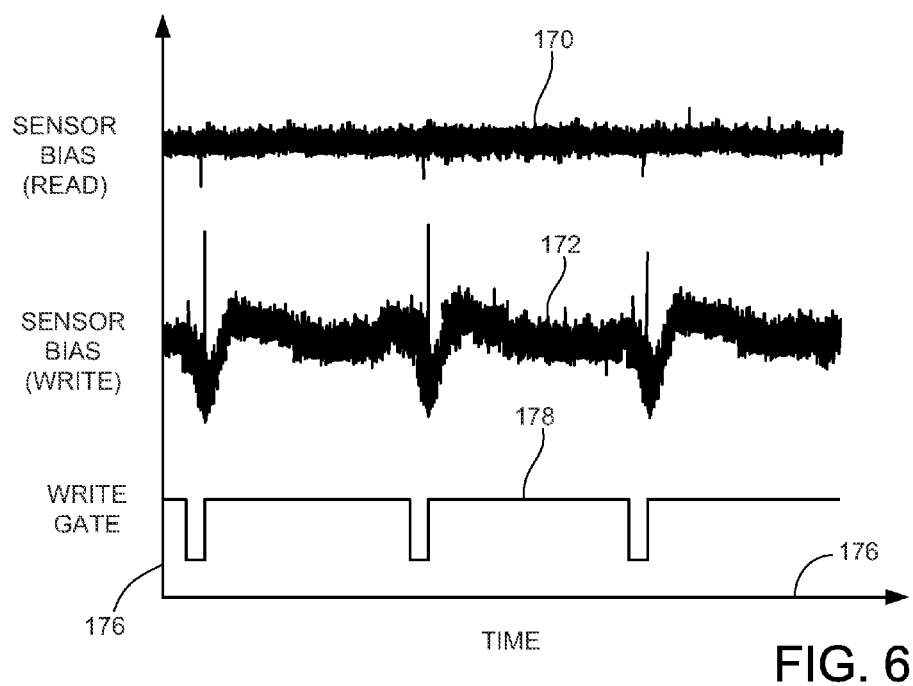
FIG. 6 graphically represents bias signals obtained from the thermally responsive sensor(s) during respective read and write operations.

FIG. 6 shows representative read and write bias (response) curves 170, 172 plotted against a time x-axis 174 and signal amplitude y-axis 176. The read response curve 170 represents the input response from a selected thermally responsive sensor 150 (FIG. 3) during read processing, and the write response curve 172 represents the corresponding input response from the sensor 150 during write processing. A write gate signal 178 denotes the periodic occurrence of the servo wedges 156 (FIG. 3) and the associated drops in write response from the sensor 150.

As can be seen in FIG. 6, calibration for the write mode is not straightforward as the thermally responsive sensor can sense the transient heat changes primarily induced by mode switching, where the writer turns on/off, in addition to heater effects. Variations in the sensors across different manufacturers and different preamp changes to modal switching can vary the thermally responsive sensor's response during mode switching, thereby requiring careful characterization to distinguish signal transients caused by contact events from signal transients caused by mode switching.

The transient response of the thermally responsive sensor 150 as shown by curve 172 generally increases with write current and can affect the resultant threshold that is detected. Other external factors that can affect the transient responses of sensor 150 include the sensor's thermal response sensitivity that can vary from sensor to sensor, unique airflow in the system caused by varying sizes of disk media, ambient drive temperatures, etc. All of these potential variables require characterization to determine any non-linearity. Yet characterization may not catch outliers for these and other variables.

Further, the described transient responses of the thermally responsive sensor 150 may not settle, e.g., until after 15 μs following the modal change. Some previously described options to address this delay include using preamplifier modal fault masking or heater fault masking such that the transients are masked out of the signal. But these masking techniques reduce the time window for detecting potential contact events. For example, masking up to 10 μs in a wedge of 30 μs could cause a loss of 33% of the detection window.

One technique for detecting a contact event utilizes a contact detection system having a control circuit that is adapted to perform a noise floor calibration routine to establish appropriate signal detection thresholds during read and write operations, followed by a detection routine to establish suitable fly heights for the transducer during such read and write operations. A contact event between the transducer and the medium is detected responsive to an accumulated plural count of pulses in a bias signal obtained from the thermally responsive sensor.

In some embodiments of the present disclosure, the contact energy of the thermally responsive sensor can be utilized to detect contact events. The bias signal from the thermally responsive sensor can be rectified and then integrated to determine the voltage across the sensor. This voltage represents the energy of contact between the transducer and the magnetic data recordable medium. Voltage values above a predetermined threshold can indicate a contact event, where the threshold could be deemed as the representation of the energy produced when contact occurs.

Figure 7:
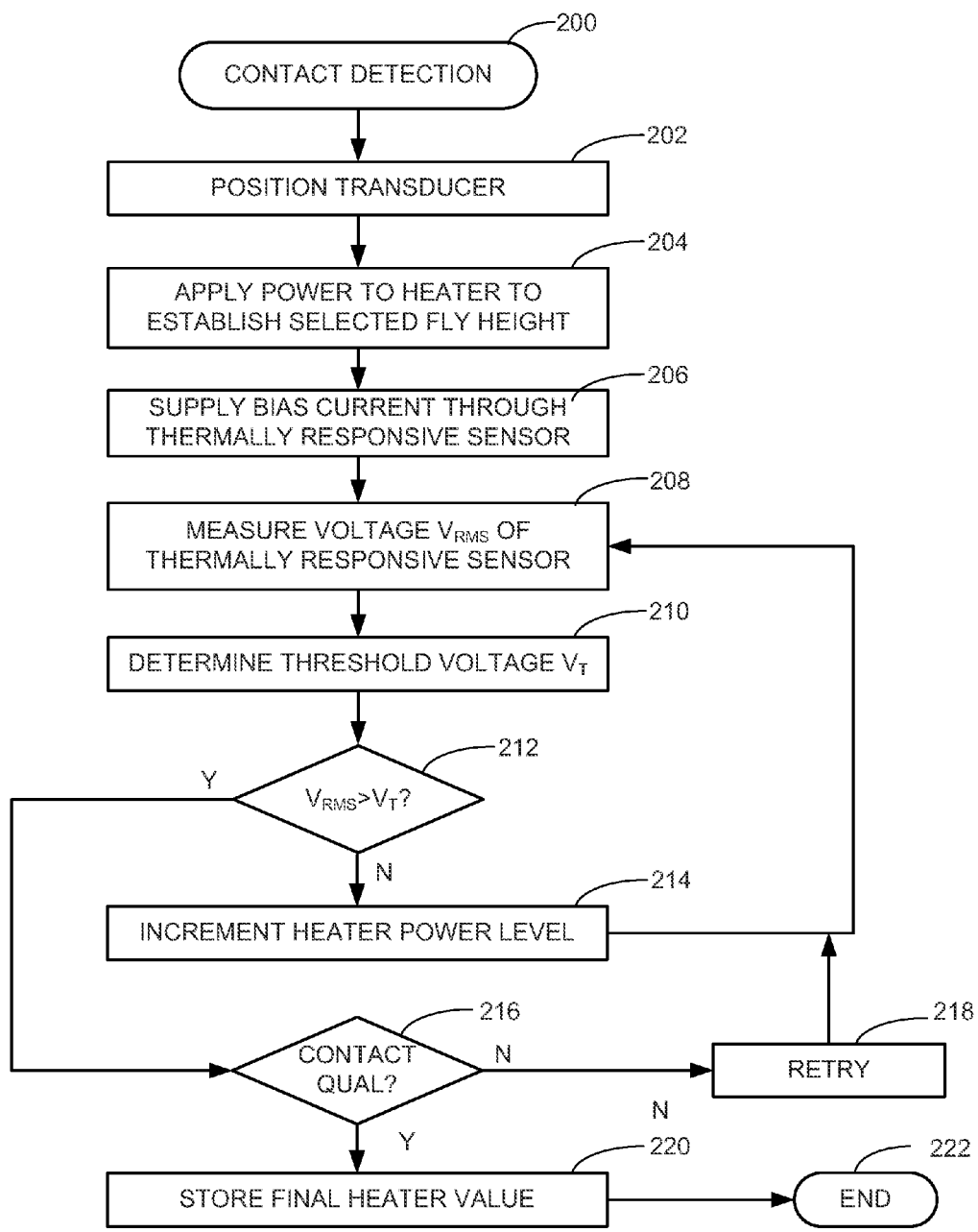
FIG. 7 is a contact detection routine.

For example, FIG. 7 illustrates one embodiment of contact detection routine 200. The routine 200 is also carried out by and/or under the direction of the preamp 128 (FIG. 2) or other control circuit or circuits to establish appropriate write and read heater values. For illustrative purposes only, the routine 200 will be described in reference to the system 100 of FIG. 1, although the routine 200 may utilize any suitable system described herein. In some embodiments, write processing is carried out first, followed by read processing using one or more test tracks.

Generally, the routine 200 at 202 operates to position a transducer (e.g., transducer 104 of FIG. 1) with respect to a recording medium (medium 106) to start at a non-contact fly height and perform write operations while monitoring for detected contact events. The transducer 104 can be moved to a selected test track or other location, such as in a selected zone (e.g., Zone 1 of FIG. 4). Other suitable parametric initializations can take place at this time.

In some embodiments, the transducer 104 includes a writer 108, a reader 110, a heater 112, and a thermally responsive sensor 114. In some embodiments, a preamplifier/driver circuit (e.g., preamp 128 of FIG. 2) can be coupled to the transducer 104 to supply write signals to the writer 108, to supply read bias signals to the reader 110, to supply heater signals to adjust the fly height of the transducer, and to supply the bias current through the thermally responsive sensor 114 to generate the bias signal.

An initial write heater HW is applied at 204. It is contemplated that the HW value can be initially relatively low to ensure non-contact during initial stages of the write processing. Write heater power is successively incremented at 204 to establish a fly height of the transducer 104 relative to the medium 106. At 206, a bias current is supplied through the thermally responsive sensor 114 to generate a bias signal. In some embodiments, the heater includes a first heater operative during a write operation during a writing of data, and the transducer includes a second heater operative during a read operation during a reading of data, e.g., transducer 130 of FIG. 3. In such embodiments, power is applied to a selected one of the first or second heaters selected responsive to the thermally responsive sensor. In some embodiments, the power applied to the first heater during the write operation is at a first power level, and the power applied to the second heater during the read operation is at a different, second power level. The first and second power levels are respectively selected responsive to the thermally responsive sensor.

A write operation to write data by applying a write signal to the writer is performed, and a contact event is detected during the application of the write signal. In some embodiments, writing data to the medium using the writer is coincident with monitoring the bias signal obtained from the thermally responsive sensor.

During the writing process, a root mean square (RMS) voltage of the thermally responsive sensor $V_{RMS}$ is measured at 208 based on the bias signal. Any suitable technique or techniques may be used to measure $V_{RMS}$. For example, in one embodiment, the preamp 128 can include a rectifier to convert a bipolar alternating current (AC) signal response of the sensor to a rectified bias signal having positive polarity. Any suitable rectifier or rectifier circuitry can be utilized. The rectified bias signal can be integrated to determine the RMS voltage of the rectified bias signal. Any suitable integrator or integrator circuitry can be utilized to integrate the rectified bias signal. The conversion of the signal response of the sensor to an RMS voltage representation of the contact energy of the sensor in some embodiments eliminates the need to calibrate the sensor as it desensitizes the sensor to signal transients introduced by mode switching.

At 210, a threshold voltage $V_T$ is determined. Any suitable technique can be used to determine $V_T$. In one embodiment, the moving average ($V_{MA}$) and sigma ($V_{SIGMA}$) of a desired number of previous values of $V_{RMS}$ can be collected and calculated using the following formula:

$$V_T = V_{MA} + (d \ast V_{SIGMA})$$

where d is a weighting factor that is determined mathematically or experimentally based upon contact profiles of several systems. The present value of RMS Voltage of the bias signal $V_N$ can then be compared against this $V_T$ using any suitable technique or circuitry.

At 212, a contact event indicating contact between the transducer 104 and medium 106 is detected based on $V_{RMS}$ being greater than $V_T$. If a contact event is not detected, then the heater power can be increased by a suitable increment at 214, thereby bringing the transducer 104 closer to the medium 106, and the foregoing steps can be repeated. The power applied to the heater, therefore, is at a power level selected responsive to the thermally responsive sensor. In some embodiments, the power applied to the heater is at a power level selected responsive to the detected contact event.

If, however, a contact event is detected at 212, then the event can be qualified at 216. Such qualification can be performed in a variety of ways, such as using a time-based rolling average or other statistical means to verify that an actual contact was detected. For example, a number of detected events in a relatively localized area as compared to spurious single contact events that are widely distributed around the circumference of the track can be indicative of an actual contact event. Similarly, a localized off-track deflection coincident with or immediately following the contact events can be indicative of an actual contact event.

If the contact event is not qualified, the test is repeated as shown at 218 using the same parameters to determine if the contact event can be repeated. If the contact event is qualified and determined to have occurred with sufficient confidence, the routine passes to 220 where a final write heater value HWF is selected and stored. The final write heater value may be derated from the last heater value used during the last pass through the routine.

The foregoing steps are then repeated to determine a final read heater value HRF, which is also selected and stored at 220, after which the process ends at 222.

It will be appreciated that the routine 200 of FIG. 7 advantageously identifies final write and read heater power levels for subsequent use during normal operation. Relevant portions of the routine 220 can be executed by the preamp (e.g., preamp 128 of FIG. 2) during normal read and write operations, respectively, to accumulate counts and identify, as desired, actual contact events.

In the event a contact event is detected during subsequent normal operation, a variety of actions can be taken by the device 100 including a repeating of the associated write or read operation, the application of a write/read verify to ensure the data are correctly written, application of higher levels of on-the-fly error detection/correction to recovered read data to ensure proper readback, on-the-fly adjustments to the applicable write and/or read heater power levels, and so on. Should a statistically significant number of qualified contact events be detected, the system may elect to proceed with a new calibration sequence to obtain updated heater power levels.

While routine 200 was described in the context of a write operation, the routine can also be utilized during a read operation to read data, where a read bias signal is applied to the reader. In these embodiments, the contact event is detected during the application of the read bias signal.

Any suitable apparatus or device can be utilized to perform the routine 200, e.g., data system 120 of FIG. 2. In system 120, the preamp 128 can include a control circuit coupled to the transducer that is adapted to apply power to the heater to establish a fly height of the transducer relative to the medium; supply a bias current through the thermally responsive sensor to generate a bias signal; measure an RMS voltage of the thermally responsive sensor $V_{RMS}$ based on the bias signal; determine a threshold voltage $V_T$; and detect a contact event between the transducer and the medium based on $V_{RMS}$ being greater than $V_T$. In some embodiments, the control circuit includes a comparator adapted to compare $V_{RMS}$ to $V_T$ to identify the contact event between the transducer and the medium.

As mentioned herein, the preamp 128 can also include a rectifier or rectifier circuitry that can be utilized to rectify the bias signal from the thermally response sensor 130, and an integrator or integrator circuitry than is configured to integrate the rectified bias signal to provide $V_{RMS}$.

Figure 11:
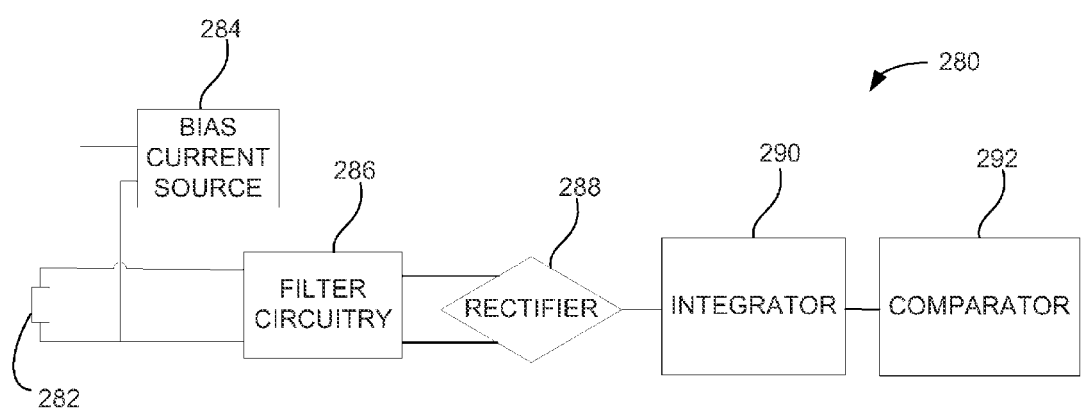
FIG. 11 depicts an RMS voltage circuit of the preamp of FIG. 2.

For example, FIG. 11 is a schematic diagram of an exemplary embodiment of an RMS voltage circuit 280 that can be included in the preamp 128 to assist in determining a contact event. A controller (e.g., controller 122 of FIG. 2) can direct bias current source 284 to apply a bias current to a thermally responsive sensor 282. A bias signal produced by the thermally responsive sensor 282 can be filtered by optional filter circuitry 286, which can include any suitable filter circuits or circuitry, e.g., high-pass/low-pass filters, etc. The bias signal is then rectified by rectifier 288 to convert, e.g., a bipolar AC signal response of the sensor to a rectified bias signal having positive polarity. The rectified bias signal can be integrated by integrator 290 to determine the RMS voltage of the rectified bias signal. Comparator 292 then can compare $V_{RMS}$ to $V_T$ to identify a contact event between a transducer (e.g., transducer 130 of FIG. 3) and a medium (e.g., medium 132 of FIG. 2).

In some embodiments, the preamp 128 can provide a $V_{RMS}$ signal to an analog-to-digital conversion circuit (ADC) for wedge-to-wedge sampling or other techniques to assist in determining a contact event. The sampling of the contact energy could be done on this wedge-by-wedge basis for different techniques of determining contact in addition to the techniques described herein.

Figure 8:
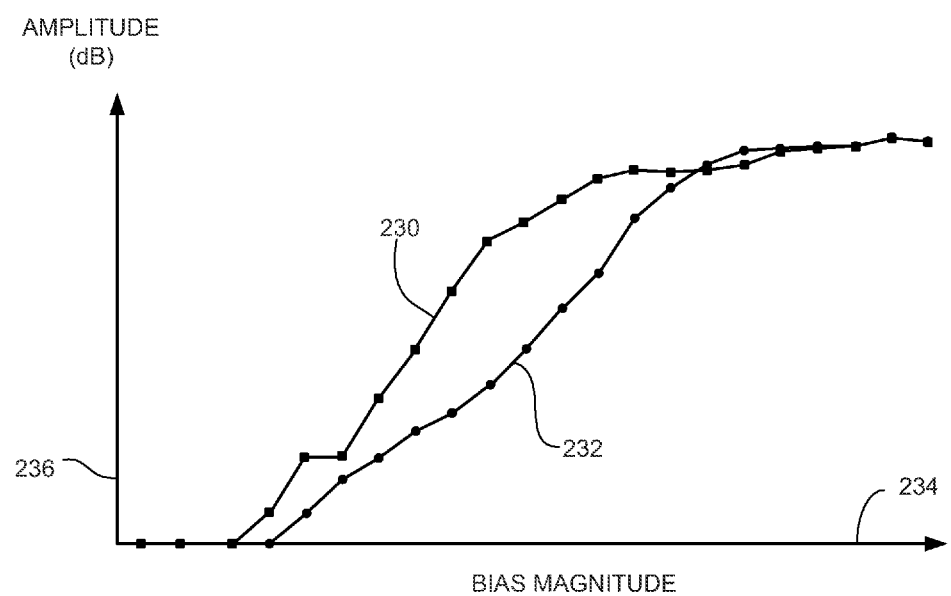
FIG. 8 shows bias response characteristics of the thermally responsive sensor(s).

Any suitable technique or techniques can be utilized to provide suitable bias signals to the thermally responsive sensor. For example, FIG. 8 depicts bias design point curves 230, 232 plotted against a bias x-axis 234 and amplitude (SNR) y-axis 236. The bias represents the power biasing, such as in the form of applied voltage and/or current, that is supplied to the respective sensors 150 (FIG. 3) during the foregoing detection processing. Suitable bias levels in substantially linear regions can be selected.

Figure 9:
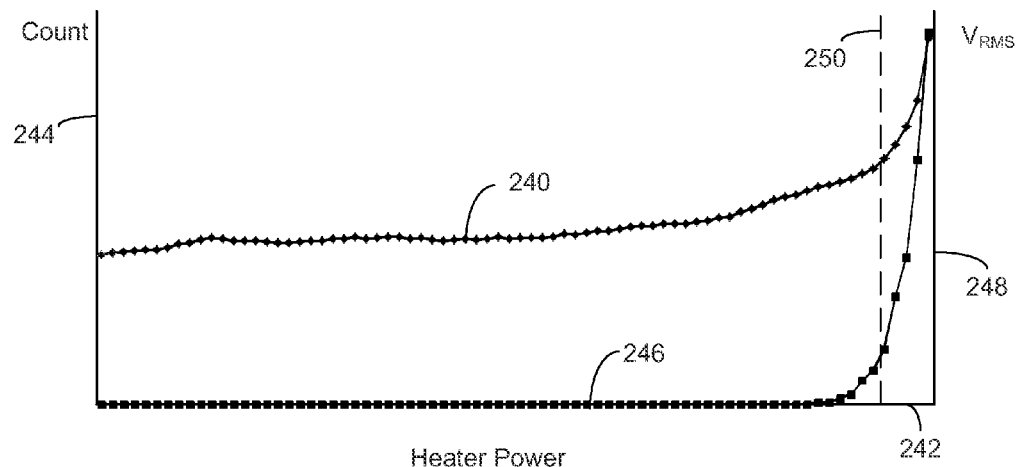
FIG. 9 provides a comparison of contact events indicated by measuring the RMS voltage across a thermally responsive sensor versus contact events indicated by counting peaks in a bias signal provided to the sensor.

FIG. 9 is a graph that depicts an exemplary $V_{RMS}$ curve 240 applied against power supplied to a heater on the x-axis 242 and $V_{RMS}$ on the secondary y-axis 248 during a read operation. The graph also depicts an exemplary accumulated count curve 246 applied against power supplied to the heater on the x-axis 242 and the accumulated count on the primary y-axis 244 also during a read operation.

Accumulated count techniques can be utilized to provide curve 246. Such techniques can utilize a contact detection system having a control circuit that is adapted to perform a noise floor calibration routine to establish appropriate signal detection thresholds during read and write operations, followed by a detection routine to establish suitable fly heights for the transducer during such read and write operations. A contact event between the transducer and the medium is detected responsive to an accumulated plural count of pulses in a bias signal obtained from the thermally responsive sensor.

An exponential-type response can be observed in curve 240, resulting from actual contact events between the transducer and the medium. This is in contrast to the avalanche-type response of curve 246. Suitable contact energy thresholds (e.g., $V_T$) can be selected accordingly, such as denoted at 250.

Figure 10:
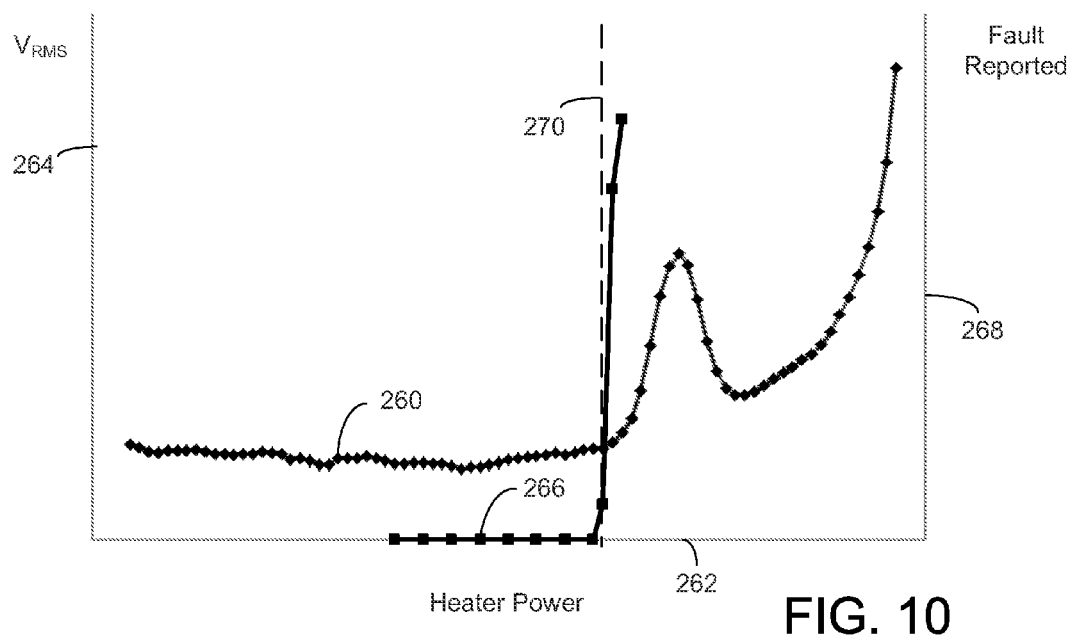
FIG. 10 provides a comparison of contact events indicated by measuring the RMS voltage across a thermally responsive sensor versus the number of contact events.

FIG. 10 is a graph that depicts an exemplary $V_{RMS}$ curve 260 applied against power supplied to a heater on the x-axis 262 and $V_{RMS}$ on the primary y-axis 264 during a write operation. The graph also depicts an accumulated count curve 266 applied against power supplied to the heater on the x-axis 262 and the number of faults reported on the secondary y-axis 268 also during a write operation. This accumulated fault count was collected from an exemplary drive to indicate write operation contact detection. As can be seen in FIG. 10, a contact event is certified at 270. Curve 260 exponentially increases at the certified contact event 270. This indication of a contact event in curve 260 agrees with the contact event indicated by the accumulated count data curve 266.

From the foregoing it will be understood that the various embodiments disclosed herein can provide a number of benefits. The in situ contact detection scheme advantageously detects actual vertical contact between the transducers and the media directly, rather than merely relying on horizontal (e.g., off-track) after-contact displacement. Consistent and repeatable measurements can be obtained across all media/transducer/radius combinations. The methodology is readily adaptable for field use in both setting suitable read and write heater power levels, and also in subsequently detecting actual contact events.

In some embodiments, the methodology reduces the myriad variables affecting fly height into two basic parameters: bias levels and threshold detection levels. These two parameters can be updated as required during subsequent field operation. Reduced slider/media contact can reduce burnishing, lubrication disturbance and other effects, thereby increasing system reliability. It has been found in some cases that the disclosed methodology can provide a significantly reduced overall calibration time to arrive at appropriate heater levels and an integrated contact detection mechanism that continuously verifies and, as necessary, adjusts these levels.

Further, in some embodiments, the techniques described herein can reduce the number of tuning parameters from 3 to 1 as only bias needs to be tuned, while gain and threshold counts do not. These techniques can also provide more accurate and robust contact detection by removing the variability between individual sensor devices and their transient responses to read/write mode changes. Further, at least some embodiments of the techniques described herein do not require characterization of every sensor revision from various sensor manufacturers under various drive conditions, thereby reducing the number of algorithms that need to be maintained in the system.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A method, comprising:
   positioning a transducer with respect to a recording medium, the transducer comprising a writer, a reader, a heater, and a thermally responsive sensor;
   applying power to the heater to establish a fly height of the transducer;
   supplying a bias current through the thermally responsive sensor to generate a bias signal;
   measuring a root mean square (RMS) voltage $V_{RMS}$ of the thermally responsive sensor based on the bias signal;
   determining a threshold voltage $V_T$; and
   detecting a contact event between the transducer and the medium based on $V_{RMS}$ being greater than $V_T$.

2. The method of claim 1, wherein the power applied to the heater is at a power level selected responsive to the thermally responsive sensor.

3. The method of claim 1, further comprising performing a write operation to write data by applying a write signal to the writer, wherein the contact event is detected during the application of the write signal.

4. The method of claim 1, further comprising performing a read operation to read data by applying a read bias signal to the reader, wherein the contact event is detected during the application of the read bias signal.

5. The method of claim 1, wherein the heater is a first heater operative during a write operation during a writing of data, wherein the transducer further comprises a separate, second heater operative during a read operation during a reading of data, and further wherein applying power to the heater comprises applying power to a selected one of the first or second heaters selected responsive to the thermally responsive sensor.

6. The method of claim 5, wherein the power applied to the first heater during the write operation is a first power level, wherein the power applied to the second heater during the read operation is a different, second power level, and wherein the first and second power levels are respectively selected responsive to the thermally responsive sensor.

7. The method of claim 1, wherein the power applied to the heater is at a power level selected responsive to the detected contact event.

8. The method of claim 1, wherein one or both of the heater and the thermally responsive sensor are combined with one or both of the writer or the reader.

9. The method of claim 1, wherein detecting the contact event between the transducer and the medium further comprises writing data to the medium using the writer coincident with monitoring the bias signal obtained from the thermally responsive sensor.

10. The method of claim 1, wherein positioning the transducer with respect to the recording medium further comprises coupling a driver circuit to the transducer to supply write signals to the writer, to supply read bias signals to the reader, to supply heater signals to adjust the fly height of the transducer, and to supply the bias current through the thermally responsive sensor to generate the bias signal.

11. The method of claim 10, wherein measuring $V_{RMS}$ comprises:
   detecting the bias signal from the thermally responsive sensor;
   rectifying the bias signal; and
   integrating the rectified bias signal to provide $V_{RMS}$.

12. An apparatus comprising:
   a recording medium;
   a transducer adjacent the recording medium, wherein the transducer comprises a writer, a reader, a heater, and a thermally responsive sensor; and
   a control circuit coupled to the transducer and adapted to:
      apply power to the heater to establish a fly height of the transducer;
      supply a bias current through the thermally responsive sensor to generate a bias signal;
      measure a root mean square (RMS) voltage $V_{RMS}$ of the thermally responsive sensor based on the bias signal;
      determine a threshold voltage $V_T$; and
      detect a contact event between the transducer and the medium based on $V_{RMS}$ being greater than $V_T$.

13. The apparatus of claim 12, wherein the control circuit generates and stores in a memory a power level value responsive to the thermally responsive sensor, wherein the control circuit is further operative to apply the power level value to a driver circuit which in turn applies the power to the heater in an amount associated with a magnitude of the power level value.

14. The apparatus of claim 12, wherein the heater is a first heater operative during a write operation during a writing of data to the medium using the writer, the transducer further comprises a separate, second heater operative during a read operation during a reading of data from the medium using the reader, and the control circuit applies a first power level to the first heater during the write operation and applies a different, second power level to the second heater during the read operation, wherein the control circuit further operates to select the respective first and second power levels responsive to the thermally responsive sensor.

15. The apparatus of claim 12, wherein the control circuit comprises a comparator adapted to compare $V_{RMS}$ to $V_T$ to identify the contact event between the transducer and the medium.

16. The apparatus of claim 12, wherein the detected contact event is used by the control circuit to subsequently select and store in a memory a power level for the heater during a subsequent read or write operation.

17. The apparatus of claim 12, wherein the control circuit is further adapted to write data to the medium using the writer while monitoring the bias signal obtained from the thermally responsive sensor.

18. The apparatus of claim 12, wherein the thermally responsive sensor comprises more than one sensor, each sensor placed in a location to collect information regarding the contact event.

19. A system comprising:
   a recording medium adapted for rotation about a central axis, the recording medium storing a plurality of spaced apart servo wedges that define tracks adapted to store data in data sectors between adjacent pairs of the servo wedges;
   a transducer adjacent the recording medium comprising a writer adapted to store data to the data sectors, a reader adapted to read back the data stored to the data sectors and to read back servo data from the servo wedges, a write heater adapted to lower a fly height distance between the writer and the medium responsive to an applied write heater value, a read heater adapted to lower a fly height distance between the reader and the medium responsive to an applied read heater value, and at least one thermally responsive sensor; and
   a preamplifier circuit adapted to, during a write operation:
      apply write signals to the writer to write data to a selected track;
      apply the write heater value to the write heater to establish a first fly height distance for the writer;
      apply a bias current to the thermally responsive sensor to generate a bias signal;
      measure a root mean square (RMS) voltage $V_{RMS}$ of the thermally responsive sensor based on the bias signal;
      determine a threshold voltage $V_T$; and
      detect a contact event between the transducer and the medium based on $V_{RMS}$ being greater than $V_T$.

20. The apparatus of claim 19, wherein the preamplifier circuit further generates and stores the write heater value and the read heater value in a memory responsive to at least one detected contact event.

* * * * *